United States Patent [19]

Kanayama et al.

[11] Patent Number: 4,789,891
[45] Date of Patent: Dec. 6, 1988

[54] SPACER WITH AN INCLINED SURFACE FOR MOUNTING A SOLID IMAGE PICKUP ELEMENT TO A COLOR SEPARATION PRISM

[75] Inventors: Shigehiro Kanayama; Kazuto Tanaka; Masaki Ito, all of Oomiya, Japan

[73] Assignee: Fuji Photo Optical Co., Ltd., Saitama, Japan

[21] Appl. No.: 902,879

[22] Filed: Sep. 2, 1986

[30] Foreign Application Priority Data

Sep. 11, 1985 [JP] Japan .................. 60-139384
Sep. 11, 1985 [JP] Japan .................. 60-139385

[51] Int. Cl.[4] .................................. H04N 9/097
[52] U.S. Cl. .................................. 358/55; 358/225; 358/229; 350/574
[58] Field of Search .............. 358/55, 225, 229; 350/574, 245, 252, 576

[56] References Cited

U.S. PATENT DOCUMENTS

| | | | |
|---|---|---|---|
| 4,134,129 | 1/1979 | Filipovich | 358/55 |
| 4,164,752 | 8/1979 | Doi et al. | 358/55 |
| 4,237,480 | 12/1980 | Franken et al. | 358/55 |
| 4,268,119 | 5/1981 | Hartmann | 350/173 |
| 4,323,918 | 4/1982 | Bendell | 358/50 |
| 4,591,901 | 5/1986 | Andrevski | 358/55 |
| 4,734,778 | 3/1988 | Kobayashi | 358/229 |

FOREIGN PATENT DOCUMENTS

| | | | |
|---|---|---|---|
| 2744592 | 4/1978 | Fed. Rep. of Germany | 358/55 |
| 210764 | 12/1983 | Japan | 358/229 |
| 230374 | 12/1984 | Japan | 358/229 |
| 166 | 1/1985 | Japan | 358/229 |
| 182878 | 9/1985 | Japan | 358/229 |
| 61-19584 | 6/1986 | Japan | |

Primary Examiner—James J. Groody
Assistant Examiner—Robert M. Bauer
Attorney, Agent, or Firm—Parkhust, Oliff & Berridge

[57] ABSTRACT

A solid image pickup element is adhesively attached via a spacer to the light leaving end of a color separation prism which is employed in a television camera to separate the light of an object from an optical lens system into a plurality of wavelength band components. The spacer has at least one surface to be engaged with either the color separation prism or the solid image pickup element, and the engagement surface is inclined relative to the light leaving optical axis of the prism. Therefore, a single spacer can be satisfactorily utilized for different clearances between the prism and the solid image pickup element.

12 Claims, 5 Drawing Sheets

SPACER WITH AN INCLINED SURFACE FOR MOUNTING A SOLID IMAGE PICKUP ELEMENT TO A COLOR SEPARATION PRISM

BACKGROUND OF THE INVENTION

The present invention relates to a structure for mounting a solid image pickup element, and, in particular, to a structure for mounting a solid image pickup element for use in a television camera or the like.

As well known, a color television camera is adapted to separate the light of an object from its optical lens system into R(red), G(green), and B(blue) components by means of a color separation prism, take out the respective components in the form of electrical signals by means of a solid image pickup element such as a charge coupled device or the like, or a camera tube or the like, process these electrical signals by means of an image signal processing circuit, and then project the image of the object on a television screen. The solid image pickup element such as a charge coupled device (CCD) is bonded or fixed by a threaded metal fitting to the color separation prism in such a manner that it is adjusted to correspond to the optical axes of the optical lens system and the color separation prism. After adjustment the CCD is bonded to the color separation prism with one or more spacers interposed between the light leaving end of the prism and the CCD to maintain a clearance therebetween. Conventionally, several kinds of plate-like spacers are previously prepared and a desired number of spacers are selected according to the size of the clearance. In this system, however, there are several problems to be solved. That is, several types of spacers must be previously prepared, and it takes time to select the spacers. In addition, the plate-like spacers are not able to provide a continuous clearance and thus the values of the dimension provided by the plate-like spacers are only arranged in a step-wise manner.

SUMMARY OF THE INVENTION

The present invention aims at eliminating the problems found in the above-mentioned prior art mounting structure.

Accordingly, it is an object of the invention to provide a structure for mounting a solid image pickup element such as a CCD or the like in a simple manner.

In attaining the above object, according to one aspect of the invention, there is provided a structure for mounting a solid image pickup element in which a plate-like solid image pickup element is bonded through a spacer to the light leaving end of a color separation prism which separates the light of an object from an optical lens system into a plurality of wavelength band components, characterized in that at least one of the contact surfaces of said spacer is inclined relative to the light leaving axis of the prism.

Also, in accomplishing the above object, according to another aspect of the invention, there is provided a mounting plate to which is bonded a color separation prism which separates the light of an object coming from an optical lens system into a plurality of wavelength band components, characterized in that said mounting plate has an inclined end surface on the side of the light leaving end of the prism.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereinafter be given of the preferred embodiments of a structure for mounting a solid image pickup element according to the present invention with reference to the accompanying drawings.

Figure 1:
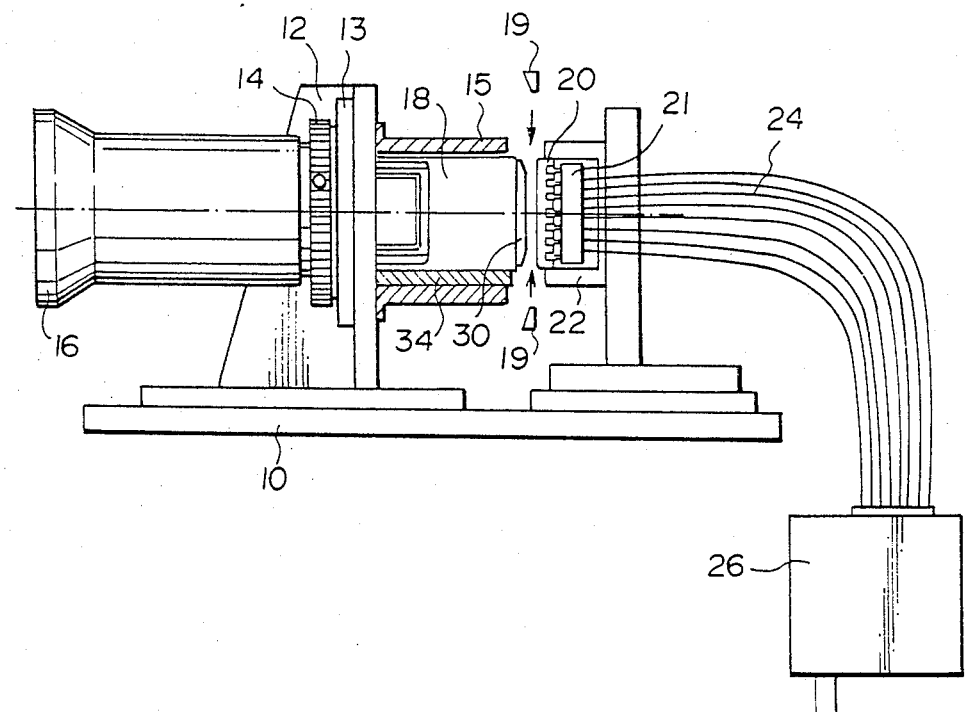
FIG. 1 is an explanatory view to show how to mount an image pickup element to a color separation prism.

In FIG. 1, a CCD as a solid image pickup element is mounted to a color separation prism in a television camera. On a base plate 10 of a mounting jig, there is erected a bracket 12. A front panel 13, a lens mount 14, and a frame 15 for holding a color separation prism, which form the television camera, are integrally held by the bracket 12. An optical lens system 16 is mounted to the lens mount 14, and a color separation prism 18 is mounted within the frame 15. The color separation prism 18 is bonded to a mounting plate 34 and then is stored in the frame 15. In order to take out electric signals of R, G and B components, CCDs 20 are attached to the three light leaving ends of the color separation prism 18 respectively. The CCDs 20 are held respectively by a 22 movably mounted on the base plate 10 of the mounting jig, are adjusted by the holder 22 such that they are aligned with one another in the vertical as well as right and left light axes thereof, and then are bonded to the light leaving end of the color separation prism 18 with a required clearance being maintained therebetween by spacers 19 which are inserted therebetween after the CCDs 20 are adjusted. Each of lead wires 24, which are used to transmit the electric signals for the color components of the CCDs 20, has one end connected to each of the CCDs 20 via a connector 21, and the other end thereof connected to a control unit 26 in which an image processing circuit is included. The object from the optical lens system 16 can be displayed in a monitor television 28 in accordance with image signals processed by the control unit 26.

Figure 2:
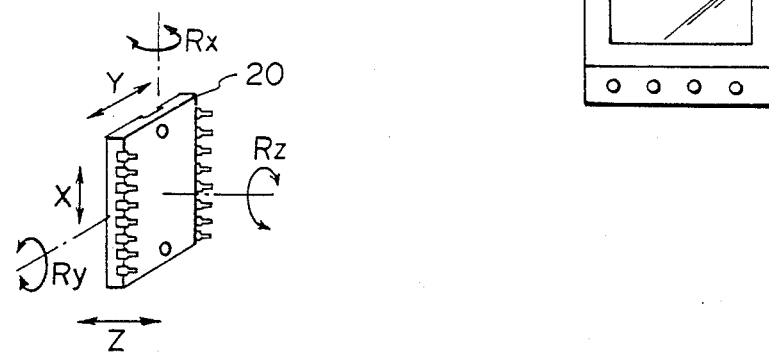
FIG. 2 is a perspective view to show the direction in which the solid image pickup element is adjusted.

FIG. 2 depicts the directions of the CCDs 20 to be adjusted. As can be seen from FIG. 2, each of the CCDs 20 requires adjustments in the directions of 3 axes (X, Y, Z) as well as in the rotational directions (RX, RY, RZ) of the 3 axes thereof.

Figure 3:
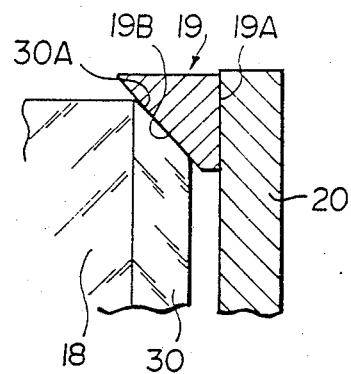
FIG. 3 is an enlarged view of a structure for mounting the solid image pickup element constructed in accordance with the invention.

Referring now to FIG. 3, there is shown a detailed structure of a mounting portion of the CCD 20. On each of the light leaving end faces of the prism 18 there is provided a bracket 30 which is formed of glass or like material similar to glass in thermal expansivity. In each of the corners of the glass bracket 30 there is formed an inclined surface 30A. On the other hand, as further shown in FIG. 3, the spacer 19 is formed on the right side surface thereof with a vertical surface 19A, while it is formed on the left side surface thereof with an surface 19B which is inclined relative to a light leaving axis. As shown in FIG. 3, the above-mentioned inclined surfaces 30A and 19B are formed such that they are substantially equal to each other in their inclined angles. In such structure, after each of the CCDs 20 is adjusted in the directions of the 3 axes thereof as well as in the directions of rotation of the 3 axes thereof, an adhesive is applied to the two surfaces 19A, 19B of the spacer 19 and, as shown in FIG. 3, the spacer 19 is then inserted into the clearance formed between the bracket 30 of the prism 18 and the CCDs 20. In such construction, even when the clearance formed between the end face of the bracket 30 and the end face of the CCDs 20 varies in width, due to the fact that at least one side surface 19B of the spacer 19 is formed as an inclined surface, the inclined surface 19B of the spacer 19 can be brought into surface contact or line contact with the inclined surface 30A of the bracket 30. In other words, the CCD 20 and the bracket 30 can be bonded to each other by one spacer 19 in a simple manner such that a required clearance can be maintained between the prism 18 and the CCDs 20.

After bonding, the optical system is removed from the jig, and further, as a dust-proff measure for the image pickup surfaces of the CCDs 20, the clearance between the prism 18 and the CCDs 20 is sealed with a seal member of silicone resin or the like.

Figure 4:
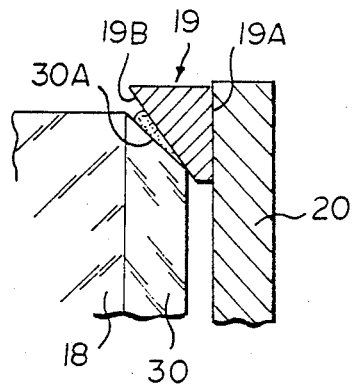
FIGS. 4 and 5 are enlarged views respectively of modifications of the above embodiment of the invention.

Although in the embodiment of FIG. 3 the inclined surface 19B of the spacer 19 is formed equal to the inclined surface 30A of the bracket 30, the angles of inclination of the two inclined surfaces 19B and 30A may be different from each other, as shown in another embodiment in FIG. 4.

Figure 5:
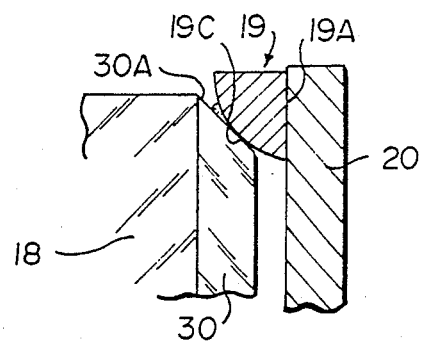

While in the embodiments in FIGS. 3 and 4 the spacer 19 is formed with the inclined surface 19B in the one side surface thereof, as shown in FIG. 5 the spacer 19 may be formed with an arc-shaped surface 19C which can also provide a similar effect. Due to the fact that the resultant contact surface is formed in a circular arc manner, surface 19C need not be as accurate as inclined surface 19B, which is an advantage over the above-mentioned two embodiments.

According to any of the above-mentioned embodiments of the invention, since the CCDs 20 are respectively attached to the prism 18 via the adhesive, unlike a case in which CCDs are attached to a prism by brazing or like means, the prism is not heated at all and thus there is no possibility that the light axes on the side of the prism or the like may be misaligned.

According to the structure for mounting the solid image pickup element constructed in accordance with the present invention, since the color separation prism and the solid iamge pickup element are attached to each other via the spacer which is provided with at least one inclined surface, a single spacer suffices for attachment of the prism and image pickup element even if a clearance formed therebetween may vary in width.

Figure 6:
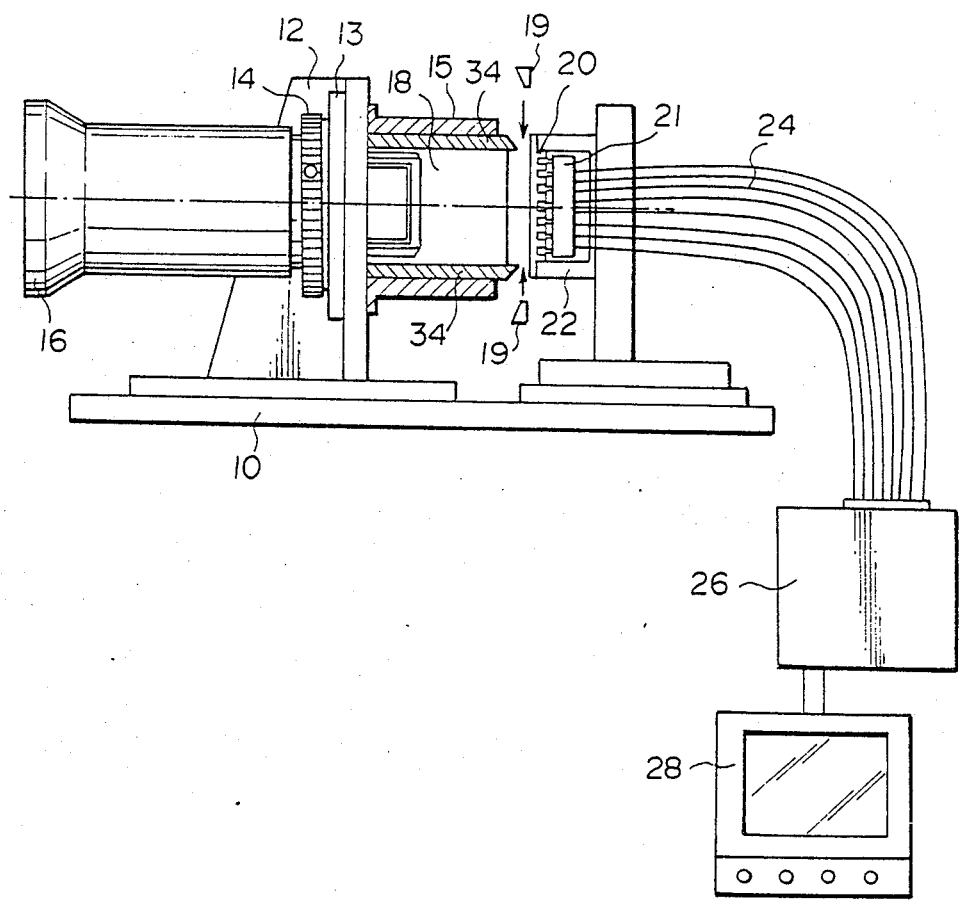
FIG. 6 is an explanatory view of a second embodiment of the invention, showing how to mount an image pickup element to a color separation prism.

Referring now to FIG. 6, there is illustrated a second embodiment of the solid image pickup element mounting structure constructed in accordance with the invention.

Figure 7:
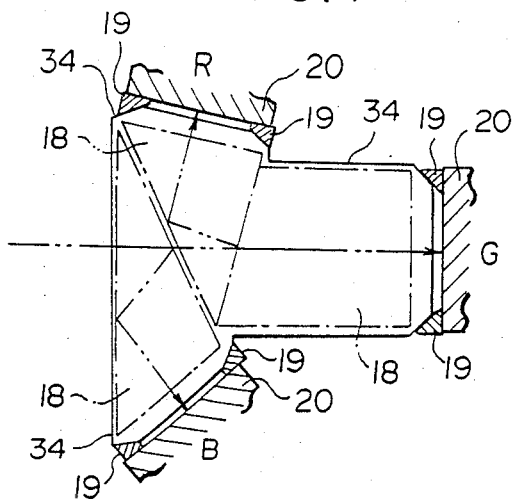
FIG. 7 is a plan view of a mounting plate employed in the invention.

The second embodiment is different from the first embodiment in that the glass bracket is not mounted to the color separation prism 18, but instead mounting plates 34 are provided respectively on the top and bottom surfaces of the prism 18. As shown in FIG. 6, the optical lens system 16 is mounted to the lens mount 14, and the color separation prism 18 is mounted within the frame 15 via the mounting plates 34. The color separation prism 18 is stored within the frame 15 after it is bonded to the mounting plates 34. As shown in FIG. 7, the CCDs 20 are mounted respectively to the three light leaving ends of the color separation prism 18 so as to be able to take out the electrical signals of R, G, and B components of the light. The CCDs 20 are held by the hodler 22 movably mounted on the base plate 10 of the mounting jig, are adjusted by the holder 22 such that they are aligned with one another in the vertical as well as right and left light axes thereof, and then are adhesively attached to the light leaving ends of the color separation prism 18 with a required clearance being maintained therebetween by spacers 19 which are inserted therebetween after the CCDs 20 are adjusted. Each of lead wires 24, which are used to transmit the electric signals for the color components of the CCDs 20, has one end which is connected to each of the CCDS 20 via a connector 21, and the other end thereof connected to a control unit 26 in which an image processing circuit is contained. The object from the optical lens system 16 can be displayed in a monitor television 28 in accordance with image or video signals processed by the control unit 26.

Figure 8:
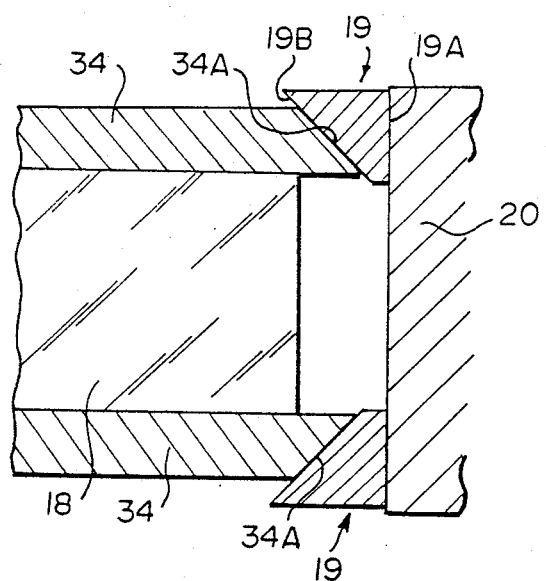
FIG. 8 is an enlarged section view of the mounting portion of a solid image pickup element or a CCD employed in the invention.
Figure 9:
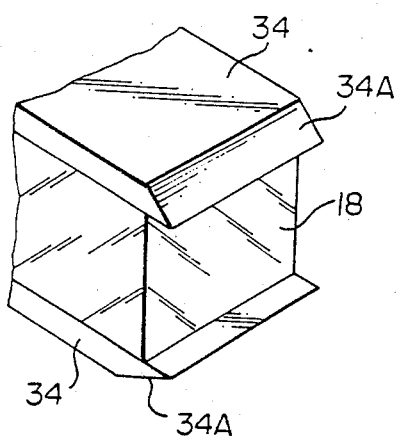
FIG. 9 is an enlarged view of a mounting plate used in a second embodiment of a color separation optical system of the invention.

In FIG. 8, there is shown in detail a structure of the mounting portion of the CCD 20, while, in FIG. 9, there is illustrated a structure of the mounting plate 34. The mounting plate 34 has on the light leaving side of prism 18 an end face which is formed as an inclined surface 34A. On the other hand, as shown in FIG. 8, the spacer 19 has a vertical surface 19A on the right side surface thereof, but on the left side surface thereof there is provided an inclined surface 19B which is formed inclined relative to the light leaving axes. As can be seen from FIG. 8, the two inclined surfaces 34A and 19B are formed such that they are substantially equal to each other in the angle of inclination. In this structure, each of the CCDs 20 is adjusted in the direction of the three axes thereof as well as in the directions of rotation of these three axes. Then, an adhesive is applied to the two surfaces 19A, 19B of the spacer 19, and the spacer 19 is then inserted into a clearance formed between the inclined surface 34A of the mounting plate 34 and the CCD 20, as shown in 8. In such construction, even if the clearance formed between the end face of the mounting plate 34 and the end face of the CCD 20 may vary in width, the inclined surface 19B of the spacer 19 can be brought into surface contact with the inclined surface 34A of the mounting plate 34 due to the fact that at least one side surface 19B of the spacer 19 is formed as an inclined surface. As a result of this, the mounting plate 34 and the CCD 20 can be adhesively attached to each other by a single spacer 19, and it is also possible to maintain a required clearance between the prism 18 and the CCD 20.

After the mounting plate and CCD are adhesively attached, the optical system is removed from the mounting jig. In addition, as a dust-proof precaution for the image pickup surface of the CCD, the clearance formed between the prism and the CCD 20 is sealed by a seal member of silicone resin or the like.

Figure 10:
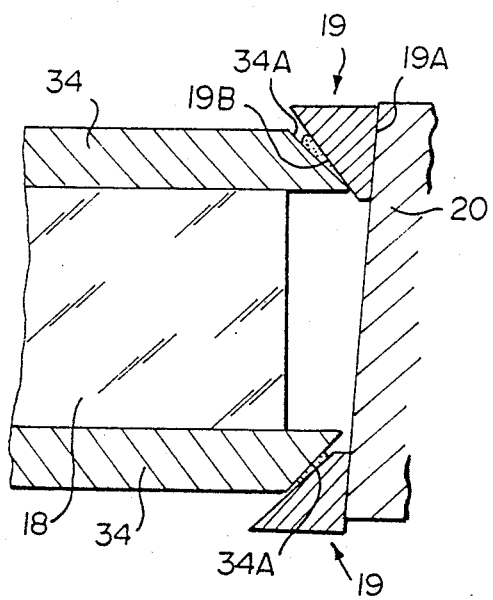
FIG. 10 is a section view of a modification of a spacer employed in the second embodiment mentioned above; and, FIG. 11 is a perspective view of a modification of the mounting plate in the above second embodiment.

Alternatively, as shown in FIG. 10, the inclined surfaces 19B and 34A may be different from each other in the angle of inclination so that the inclined surface 19B may be brought into line contact with the inclined surface 34A.

Figure 11:
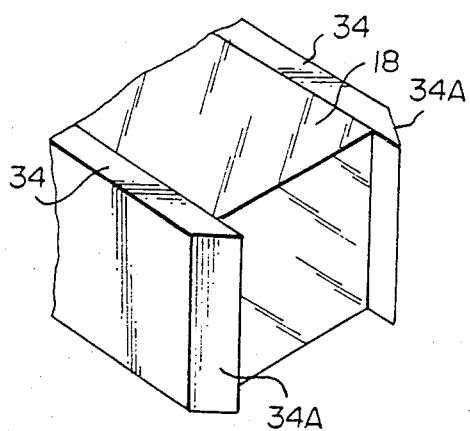

Further, although in the above-described embodiment as shown in FIG. 9 the mounting plate 34 are respectively mounted on the upper and lower surface of the color separation prism 18, the mounting plate 34 may be provided right and left of the prism 18 respectively, as shown in FIG. 11.

As has been described above, with use of the mounting plates in the color separation optical system of the present invention, the end surface of each of the mounting plates to which the color separation prism is adhesively attached to form as an inclined surface, with the result that one or more solid image pickup elements such as CCDs or the like can be bonded directly to the mounting plates through spacers. Also, since there is no need to provide a bracket in the color separation prism, there is no need for machining of the prism for purposes of mounting the bracket, which prevents the prism from being damaged or scratched.

It should be understood, however, that there is no intention to limit the invention to the specific forms disclosed. On the contrary, the invention is to cover all modifications, alternate constructions and equivalents falling within the spirit and scope of the invention as expressed in the appended claims.

What is claimed is:

1. A structure for mounting a solid image pickup element to the light leaving end of a color separation prism for separating the light of an object from an optical lens system into a plurality of wavelength band components, said structure comprising at least one spacer interposed between and attached to said color separation prism and said solid image pickup element, said spacer having at least one surface obliquely inclined with respect to the light leaving axis of said color separation prism and being capable of maintaining, between said solid image pickup element and said color separation prism, a required clearance selectable from a range of possible clearances varying in width in a stepless manner.

2. A structure as set forth in claim 1, wherein a bracket is provided at said light leaving end of said color separation prism, and further wherein a surface of said spacer located on the side of said color separation prism is inclined relative to the light leaving optical axis of said prism and is adhesively attached to said bracket while a surface of said spacer located on the side of said solid image pickup element is vertical relative to the light leaving optical axis of said prism and is adhesively attached to said solid image pickup element.

3. A structure as set forth in claim 2, wherein a surface of said bracket to which said spacer is adhesively attached is inclined relative to the light leaving optical axis of said prism.

4. A structure as set forth in claim 3, wherein the inclination angle of said inclined surface of said spacer is substantially equal to the inclination angle of said inclined surface of said bracket.

5. A structure as set forth in claim 3, wherein the inclination angle of said inclined surface of said spacer is different from the inclination angle of said inclined surface of said bracket.

6. A structure as set forth in claim 3, wherein said inclined surface of said spacer has a circular arc shape.

7. A structure as set forth in claim 1, wherein at least one mounting plate is provided on said color separation prism, and further wherein a surface of said spacer located on the side of said color separation prism is inclined relative to the light leaving optical axis of said prism and is adhesively attached to said mounting plate while a surface of said spacer located on the side of said solid image pickup element is vertical relative to the light leaving optical axis of said prism and is adhesively attached to said solid image pickup element.

8. A structure as set forth in claim 7, wherein said inclined surface of said spacer is adhesively attached to a surface of said mounting plate which is inclined relative to the light leaving optical axis of said prism.

9. A structure as set forth in claim 8, wherein the inclination angle of said inclined surface of said spacer is substantially equal to the inclination angle of said inclined surface of said mounting plate.

10. A structure as set forth in claim 8, wherein the inclination angle of said inclined surface of said spacer is different from the inclination angle of said inclined end face of said mounting plate.

11. A structure as set forth in claim 7, wherein said color separation prism has two opposite side surfaces, a mounting plate is provided on each of said opposite side surfaces, and a spacer is attached to each of said mounting plates.

12. A structure as set forth in claim 1, wherein said at least one spacer is non-annular and wedge-shaped.

* * * * *